June 2, 1964 R. F. PEZZILLO 3,135,211

MOTOR AND PUMP ASSEMBLY

Filed Sept. 28, 1960 3 Sheets-Sheet 1

INVENTOR.
RINALDO F. PEZZILLO
BY *Albert S Perry*.
ATTORNEY

June 2, 1964 R. F. PEZZILLO 3,135,211
MOTOR AND PUMP ASSEMBLY
Filed Sept. 28, 1960 3 Sheets-Sheet 2

INVENTOR.
RINALDO F. PEZZILLO
BY Albert Sperry
ATTORNEY

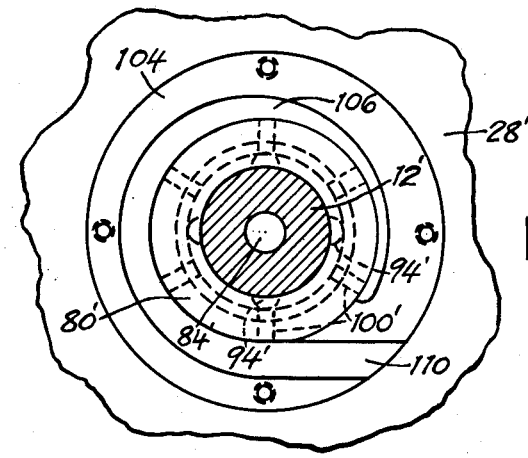
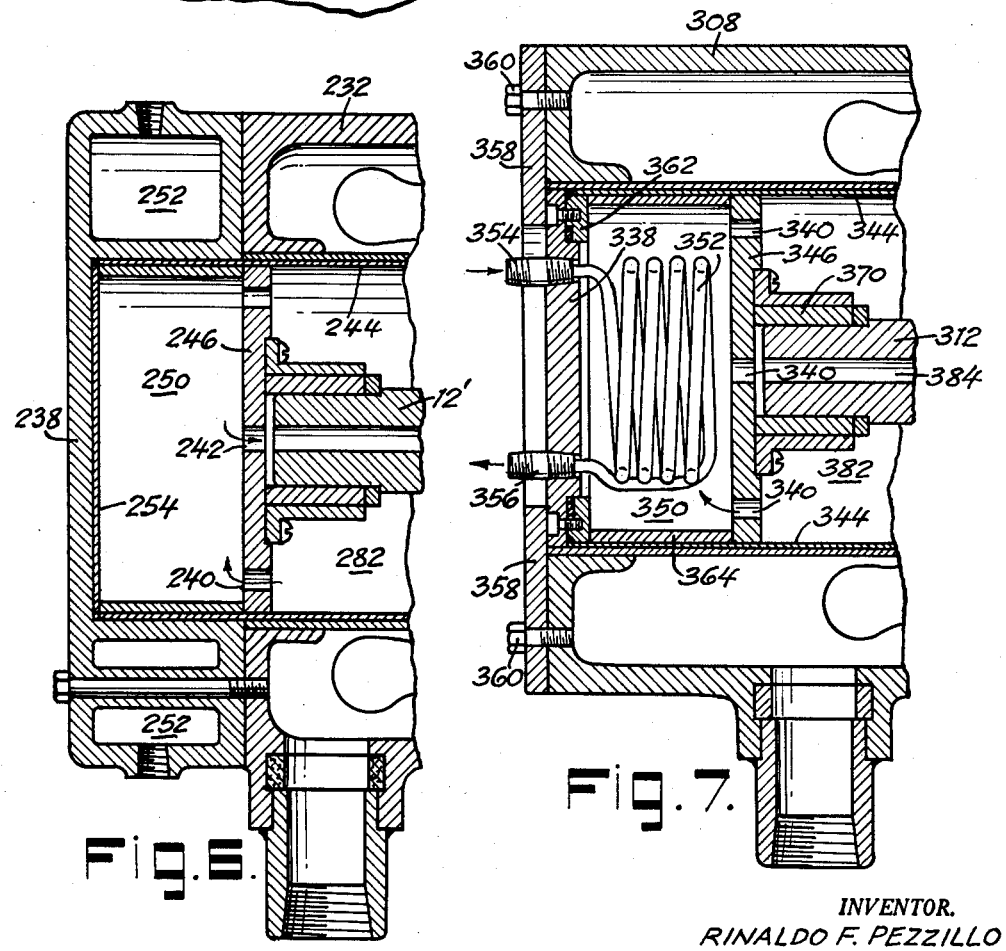
INVENTOR.
RINALDO F. PEZZILLO
BY Albert Sperry
ATTORNEY

United States Patent Office 3,135,211
Patented June 2, 1964

3,135,211
MOTOR AND PUMP ASSEMBLY
Rinaldo F. Pezzillo, Levittown, Pa., assignor to Integral Motor Pump Corporation, Levittown, Pa., a corporation of Pennsylvania
Filed Sept. 28, 1960, Ser. No. 59,026
10 Claims. (Cl. 103—87)

This invent relates to motors and to motor-pump assemblies and is directed particularly to constructions which assure the necessary lubrication and cooling of the motor to improve the operation thereof and permits effective sealing of the elements to enable the assembly to be employed in pumping "hard-to-handle" liquids such as slurries, colloidal solutions or high temperature liquids.

Motor-pump assemblies require effective lubrication of the elements in order to assure continued operation thereof. On the other hand, if the pump is used with hard-to-handle liquids, it is essential that the motor be sealed off from the pump so as to prevent leakage or passage of undesired material or contaminating agents into engagement with the motor and bearing members. At the same time, it is desired to provide constructions which permit ready assembly and disassembly of the parts for ease of manufacture and repair.

In accordance with the present invention, these advantages are attained by providing novel constructions and arrangements of the elements of the assembly. In particular, the sealing means employed are designed to protect the rotor and stator of the motor against leakage or the entry of contaminating agents into contact therewith while permitting ready assembly and disassembly of the parts. The construction further provides novel means for circulating lubricant and cooling fluids about the elements of the assembly.

Accordingly, the principal object of the invention is to lubricate and cool the elements of a motor or motor-pump assembly while sealing the elements so as to protect them from leakage or the entry of contaminating agents into contact with the bearings and motor of the assembly.

A further object of the invention is to simplify the construction of the elements of motor-pump assemblies whereby the cost of manufacture and the difficulties involved in assembling and disassembling the elements of the combination are reduced.

These and other objects and features of the present invention will appear from the following description thereof wherein reference is made to the figures of the accompanying drawings.

In the drawings:

FIG. 4 is a view taken on the line 4—4 of FIG. 3;

FIG. 6 is a sectional view through an alternative form of the motor casing; and

FIG. 7 is a view similar to FIG. 6 illustrating a further alternative form of the present invention.

Figure 1:
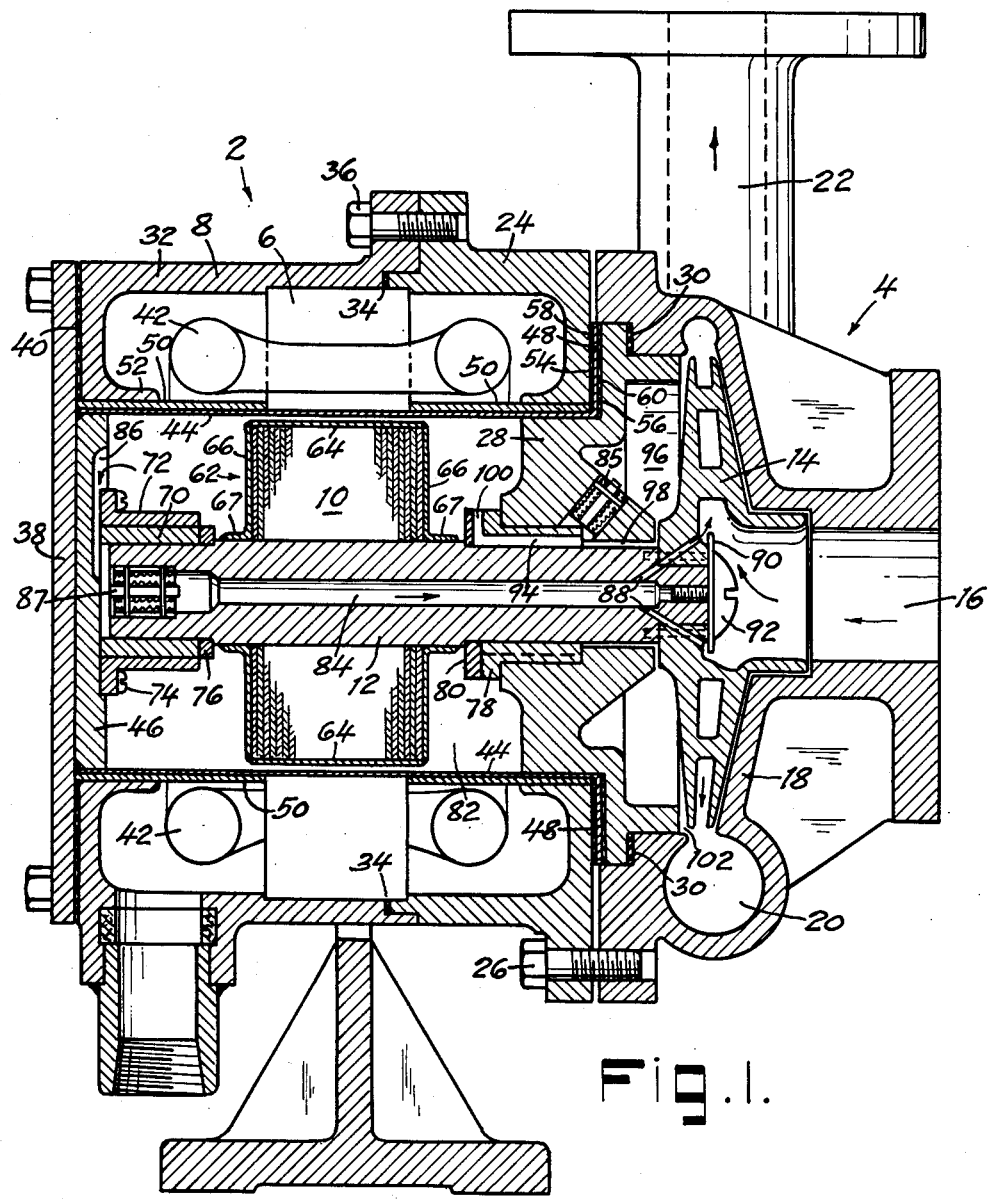
FIG. 1 is a longitudinal sectional view through a typical form of motor-pump assembly embodying the present invention.

In that form of the invention chosen for purposes of illustration in FIG. 1, the assembly embodies a motor 2 and a pump 4. The motor has a stator 6 housed within a casing 8 and a rotor 10 secured to the shaft 12. The impeller 14 of the pump 4 is positioned to receive liquid through the opening 16 in the pump housing 18 and serves to force the liquid into the pump volute 20 for discharge to an outlet pipe 22.

The pump housing 18 is secured to the front member 24 of the motor casing 8 by means of the bolts 26 and a thrust plate 28 is located between the housing 18 and the member 24 in position to be enclosed thereby. A gasket 30 which is preferably formed of "Teflon," nylon or other suitable plastic material is located between the outer edge of the thrust plate and the adjacent surface of the pump housing 18.

The motor casing 8 embodies the front casing member 24 and a rear casing member 32 which have a sealing gasket 34 positioned between adjoining surfaces thereof and are secured together by bolts 36. A back plate 38 is secured to the member 32 of the motor casing and is sealed with respect thereto by a gasket 40.

The motor 2 embodies the usual stator 6 and its windings 42 and is enclosed within the casing 8 by means of the tubular sleeve 44 formed of stainless steel, brass or other suitable non-magnetic material. The outer end of the sleeve 44 is secured to, and preferably is welded to, an end bearing supporting plate 46 which seats against the back plate 38 of the motor casing. The sleeve and bearing supporting plate thus cooperate to form a liquid-tight cup enclosing the rotor 10 and the end of the shaft 12 as well as the bearing 70 which supports the inner end of the shaft 12. The opposite end of the cup thus provided is formed with an outwardly extending flange 48 positioned between the member 24 of the motor housing and the thrust plate 28. The flange 48 may be formed separately from the sleeve 44 and welded thereto and it may be formed integral with the sleeve is desired. Reinforcing members or backers 50 are located between the stator 6 and the inturned end portion 52 of the rear motor casing member 32 of the motor casing 8.

The adjacent surfaces 54 and 56 of the front motor casing member 24 and thrust plate 28 respectively are preferably machined smooth and are sealed with respect to the flange 48 of the sleeve 44 of the cup by means of gaskets 58 and 60 located on opposite sides of the flange. The gasket 60 which is positioned between the flange 48 and the surface 56 of the pressure plate 24 is preferably formed of "Teflon," nylon or other suitable plastic material. This gasket, like the gasket 30 between the pressure plate and the pump housing 18, is compressed by the tightening of the bolts 26. Moreover, both the gasket 30 and the gasket 60 are wholly enclosed and confined by the metal surfaces they engage. It is, therefore, desirable to form these gaskets of resinous material of a type which tends to undergo cold flow when subjected to pressure but is incapable of flashing or being extruded outward between the closely fitting surfaces surrounding the same. In this way, gaskets are caused to conform exactly to the surfaces they engage and to fill the space in which they are confined so that the most intimate sealing engagement is established at these points and the leakage of liquid from the pump past the pressure plate to the motor casing is positively precluded.

The construction thus provided has a further advantage in that it permits ready access to the motor stator 6 and its windings 42 for ease in assembly and repair thereof. For this purpose, it is only necessary to remove the bolts 36 which attach the rear motor casing member 32 to the front casing member 24 whereupon the rear casing member and the back plate 38 may be removed together. The stator 6 and its windings 42 are thereby rendered accessible without disturbing the cup or the rotor without displacing shaft 12 or any remaining elements of the assembly. Assembly and repair of the stator is thereby greatly simplified.

The rotor 10 of the motor is secured to the shaft 12 and is enclosed within the shell of "can" 62 which may be formed of stainless steel or other non-magnetic material. The shell 62 as shown in FIG. 1 is formed with an outer cylindrical portion 64 and end plates 66 which are welded at their outer edges to the cylinder 64. The inner edges of the end plates 64 are provided with outwardly extending flanges 67 which are welded to the end plates 66 and to shaft 12 so that the rotor and its laminations are completely sealed against contact with the liquid or fluid circulated through the motor.

Figure 2:
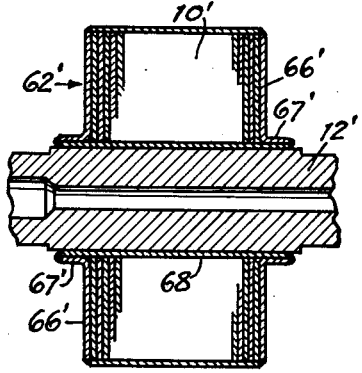
FIG. 2 is a sectional view through an alternative form of a rotor "can" which may be employed in the construction of FIG. 1.

In the alternative construction of the rotor shown in FIG. 2, the rotor 10' is provided with a central tubular sleeve 68 which preferably has a press fit on the shaft 12' although it may be pinned, keyed, welded or otherwise secured to the shaft 12'. The central flanges 67' of the end plates 66' of the rotor are welded to the sleeve 68 while the outer peripheral edges of the end plates are welded to the shell 62'. The "can" for the rotor thus forms a fluid-tight enclosure so that the rotor may be formed as a unit capable of being applied to and removed from the shaft 12' as a single element for repair or interchanging of the rotor and shaft. In this way, the manufacture, assembly and removal of the rotor or the shaft and the positioning of the rotor on the shaft 12' and with respect to the stator 6' can be effected easily and accurately to assure the most efficient operation of the motor. At the same time, the cost and time required for production, assembly and replacement of the rotor or shaft is reduced.

One end of the shaft 12 of the assembly is mounted for rotation in an end bearing 70 which is carried by a holder 72 secured in a recess machined in the inner surface of the supporting plate 46 by screws 74. A thrust washer 76 is secured to the shaft 12 and bears against the end of the bearing 70. At the opposite side of the rotor 10, the shaft 12 is supported by a front bearing 78 seated in a recess within the thrust plate 28. The bearing 78 is held in place by a thrust washer 80 secured to the shaft 12.

The construction thus provided has two very important advantages. In the first place it positively eliminates any possibility of leakage of liquid from the space 82 about the shaft and the end bearing 70, since the sleeve 44 is welded to the supporting plate 46 to form a liquid-tight cup closing the end of the space 82 and enclosing the end of the shaft and the end bearing within the motor casing. At the same time, the construction permits ready access to the shaft and its bearings since it is only necessary to remove the bolts 26 which secure the motor casing to the pump housing 18. The motor casing together with the cup and shaft end bearing 70 can then be withdrawn as a unit without disturbing the shaft 12 or any other elements of the assembly. The bearings 70 and 78 and the rotor 10 are then freely accessible for inspection, replacement or repair as necessary. This arrangement also is of advantage in assembling the parts and serves to reduce the cost and time required for producing the assembly.

In order to provide for the desired lubrication and cooling of the motor and the shaft bearings, means are provided for positively circulating a cooling and lubricating liquid through the space 82 and about the rotor 10 and the bearings 70 and 78. In the construction of FIG. 1, the liquid handled by the pump 4 is circulated through the space 82. Therefore, the shaft 12 is provided with a central bore 84 which communicates with one or more grooves 86 in the supporting plate 46 which extend from the bore 84 in the shaft to the space 82 within the cup formed by the sleeve 44 and supporting plate 46. At the forward end of the shaft 12, the bore 84 is provided with inclined passages 88 which extend to points adjacent to the marginal edges of a washer or cap 90 which is held in place by the screw member 92 that secures the impeller 14 to the shaft 12. The front bearing 78 for the shaft 12 is provided with a longitudinally extending groove 94 which communicates with the space 96 in front of the thrust plate 28 through the passage 98. The opposite end of the longitudinally extending groove 94 communicates with one or more radially extending slinger slots 100 formed in the thrust washer 80 secured to shaft 12.

This construction assures positive circulation of liquid through the space 82 within the cup and the bore 84 of shaft 12 and about the shaft bearings 70 and 78 so that the motor and bearings are effectively lubricated and cooled. The liquid under the high pressure established in the volute 20 of the pump flows through passages 102 which extend from the volute to the space 96 in front of the thrust plate 28. From space 96, the liquid flows through the passage 98 to the longitudinally extending groove 94 in the front bearing 78 and is projected radially outward through the slinger slots 100 in thrust washer 80 into the space 82 within the cup. The liquid then flows past the rotor 10 to the grooves 86 in the supporting plate 46 and into the central bore 84 in the shaft 12. The liquid entering the rear end of the shaft 12 flows forward to the inclined passages 88 where it issues adjacent to the edge of the cap 92 so as to enter the inlet or low pressure area of the pump.

The flow of liquid is not only established through the circuit extending from the high pressure area of the volute to the low pressure area of the pump but additionally the liquid is pumped and its circulation aided by the action of the slinger slots 100 in the thrust washer 80 which project the liquid outward into the space 82 by centrifugal force as the shaft 12 and the thrust washer 80 rotate together. Moreover, in returning through the central bore 84 of the shaft, the liquid issues through the inclined passages 88 which also serve to project the liquid outward by centrifugal force. Furthermore, the positioning of the outlet ends of the inclined passages 88 adjacent to the marginal portion of the washer or cap 90 provides a venturi effect due to the flow of the liquid across the ends of the passages as it is forced radially outward by the impeller. The inclined positioning of the passages 88 also serves to apply a rearward thrust to shaft 12 as the liquid is discharged therefrom.

The construction thus provided serves to assure positive and rapid circulation of the liquid through the space 82 about the rotor and on the interior of the cup formed by sleeve 44 and supporting plate 46 so as to cool the motor and assure efficient operation thereof. At the same time, the shaft and its bearings are cooled and lubricated. The forced circulation created not only assures rapid cooling of the parts but also serves to prevent clogging of any of the passages through which the liquid circulates due to the relatively high pressures developed and the high speed of flow of the cooling and lubricating liquid. Clogging of the passages may also be prevented by the use of screens such as those shown at 85 in the passage leading from the space 96 in front of thrust plate 28 to the longitudinally extending groove 94 in front bearing 78 and the screen 87 in the rear end of the bore 84 in shaft 12. The screens 85 and 87 may be replaced by flame arresters if desired when the liquid being circulated is flammable.

A further important feature of the construction described resides in the reduction of the end thrust applied to the front shaft bearing 78. This thrust is reduced by reason of the low pressure of the cooling liquid at the rear end of the shaft 12 and the rearward thrust of the liquid as it is projected outwardly through the inclined passages 88 at the forward end of shaft 12. The forces thus exerted on the shaft are in a direction opposite to the forward thrust due to the low pressure on the inlet side of the impeller 14. The forces, therefore, tend to oppose each other and serve to reduce the thrust exerted by the shaft 12 on the front bearing 78.

Figure 3:
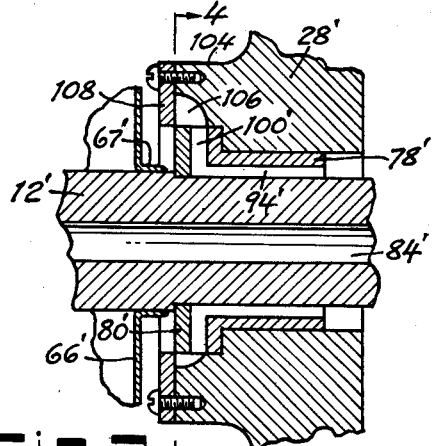
FIG. 3 is a sectional view through an alternative formation of the thrust plate which may be employed.

In order to aid further in the circulation of the liquid in the space 82, the thrust plate 28 may be formed as shown in FIGS. 3 and 4. As there illustrated, the thrust plate 28' is extended at 104 and is formed with a cavity 106 surrounding the rear end of the front bearing 78' and the slinger slots 100' in thrust washer 80'. A ring member 108 is secured to extension 104 on the thrust plate and overlies the cavity 106 so as to cooperate therewith to provide a volute having an outlet port 110. The liquid flowing through the longitudinal groove 94' in the front bearing 78' is projected outwardly from the slinger slots 100' in the thrust washer and is guided and directed by the volute cavity 106 to the single outlet port 110. In this way, considerable pressure will be built up and the liquid will issue from the port 110 in the form of a jet travelling at high speed. As a result, it is possible to increase the turbulence and cooling effect of the liquid circulating in the space 82 for cooling the motor.

The constructions shown in FIGS. 1 to 4 and described above are designed to employ the liquid being pumped as the coolant and lubricant for the assembly. However, if the liquid contains abrasive material, colloids or other agents which should not come into contact with the motor, or if the liquid is at a high temperature, it is often desirable to separate the liquid being pumped from the liquid employed to cool and lubricate the motor and shaft bearings. Under such circumstances the construction shown in FIG. 5 may be employed.

Figure 5:
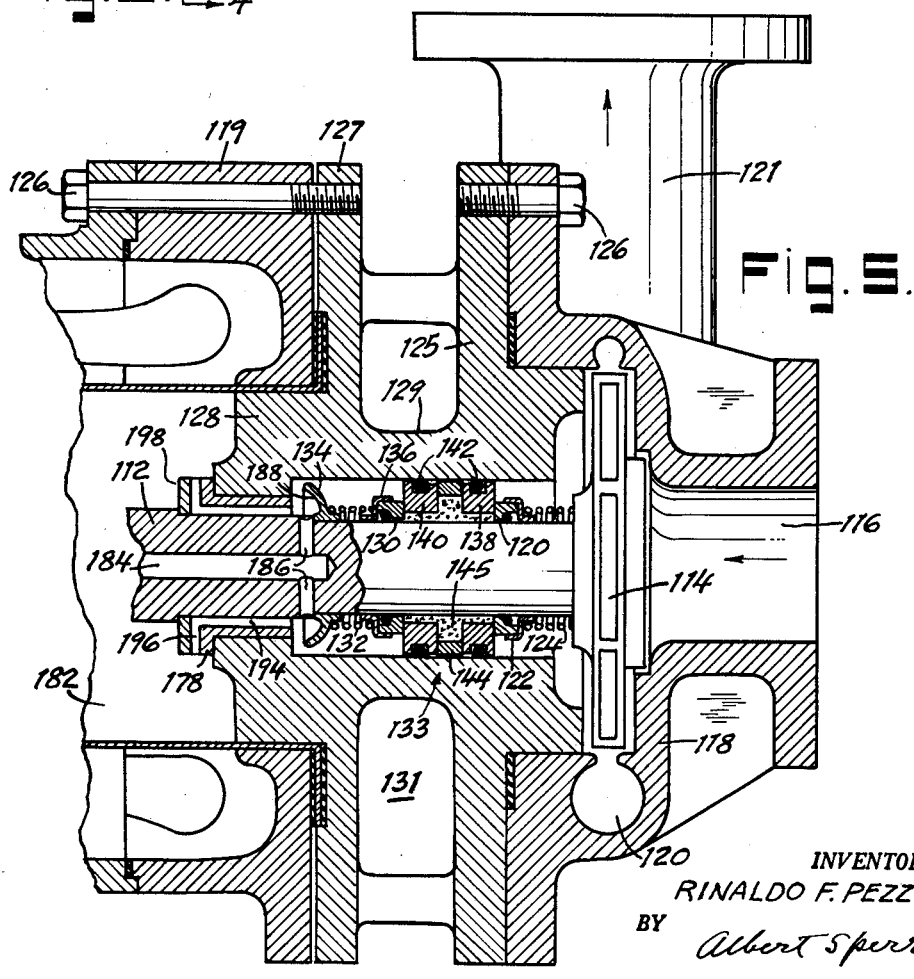
FIG. 5 is a longitudinal sectional view through a portion of a motor and pump assembly illustrating an alternative type of sealing means which may be employed therewith.

The construction of FIG. 5 is designed to handle high temperature liquids as well as slurries, colloids and other hard-to-handle liquids. The assembly embodies a pump housing 118 provided with a volute 120 to which liquid from the inlet port 116 is discharged by the impeller 114. The liquid flows from the volute to the pump outlet pipe 122. The shaft 112 to which the impeller is secured is supported by a front bearing 178 carried by the thrust plate 128. The thrust plate of the assembly to which the pump housing 118 and motor casing 119 are secured is formed with a front portion 125 and a rear portion 127 which are connected by a neck portion 129. In this way, the pump and motor are separated by an air space 131 and the transfer of heat from the pump to the motor is reduced to a minimum. The pump housing 118 is secured to the front portion 125 of the thrust plate by bolts 126, whereas the motor casing 119 is secured to the rear portion 127 of the thrust plate by bolts 126 which correspond to the bolts 26 of the construction of FIG. 1. Of course, if the liquid being pumped is not at a high temperature, a thrust plate of the type shown in FIG. 1 may be substituted for the air cooled thrust plate illustrated in FIG. 5.

Further, in order to prevent any possible leakage of hot liquid, slurries or other damaging liquid into the motor casing 119 and to prevent leakage of cooling and lubricating liquid out of the motor casing, a pressure equalizing seal is applied to the shaft 112 and preferably is located between the shaft and neck portion 129 of the thrust plate 128. This sealing means is indicated generally at 133 and is positioned between the front bearing member 178 and the pump impeller 114. The sealing means comprises a rotatable sealing member 120 carried by the shaft 112 and mounted in a holder 122 which is urged to the left as seen in FIG. 5 by a spring member 124 positioned between the impeller 114 and the holder 122. In a similar way a rotatable sealing element 130 is carried by the shaft 112 and is urged to the right as seen in FIG. 5 by a spring 132 which bears at one end against a collar 134 fixed to the shaft 112 and bears at the other end against a holder 136 for the sealing element 130. Stationary sealing elements 138 and 140 are carried by the thrust plate 128 and are sealed with respect thereto by O-rings 142. A spacer member 144 holds the stationary sealing elements 138 and 140 in spaced relation and an insoluble plastic or gelatinous sealing agent 145, such as a heavy grease or silicone gel or the like, fills the space between the stationary sealing elements and the shaft 112.

With this construction, the passage of liquid to or from the pump and the space 182 within the motor is prevented by the multiple sealing action of the two cooperating pairs of stationary and rotatable sealing elements and by the sealing effect on the gelatinous sealing material 145. Moreover, these multiple sealing elements are movable as a unit longitudinally of the shaft 112 as the pressure builds up on either side of the sealing means. Expansion and contraction of the motor lubricating and cooling liquid and variations in the pressure applied to opposite sides of the sealing means may, therefore, take place but is compensated by longitudinal movement of the pressure equalizing sealing means. As a result, the pressure of the liquids on opposite sides of the sealing means is equalized so that there is no tendency for liquid to leak past the seal or into or out of the space 182 wherein the motor is enclosed.

The shaft 112 of FIG. 5 has the central bore 184 together with radially extending passages 186 which terminate adjacent the curved inner surface 188 of the collar 134. The radially extending passages thus serve as impellers by which cooling and lubricating liquid enclosed in the space 182 is drawn from the central bore 184 and forced out through the longitudinally extending groove 194 to the slinger slots 196 in the thrust washer 198. The slinger slots further serve to propel the liquid to and through the space 182 so that effective circulation of the enclosed cooling and lubricating liquid within and about the motor and its bearings is assured.

With this construction, the liquid employed for lubricating and cooling the motor is wholly enclosed and confined within the cup and space 182 surrounding the rotor of the motor. When the liquid being pumped is a slurry or colloid, the liquid circulated through the space 182 may be the parent liquid of the slurry so that even though leakage should occur, the liquid will not be contaminated. On the other hand, if the liquid is inflammable, the screens as shown at 85 and 87 in FIG. 1 may be replaced by flame arresters which serve to protect the motor and assembly from damage.

In some instances when using the motor of the present invention with a captive liquid for lubricating and cooling the motor, there may be a tendency for the liquid to become overheated. Under such circumstances, it is possible in accordance with the present invention to conduct at least a portion of the liquid to the exterior of the motor casing for cooling the same. Thus, as shown in FIG. 6, the sleeve 244 which is located between the stator and rotor may be extended beyond the motor casing to form a cooling chamber 238. In this construction, the end of the sleeve 244 is closed by an end plate 245 and the bearing supporting plate 246 is spaced inward from the end plate 245 to cooperate therewith in forming the cooling chamber 238. The supporting plate may be held in spaced relation to end plate 145 by a ring or pins 247 so that the end bearing 270 will be properly supported to hold the shaft 212 in place.

The supporting plate 246 is formed with one or more openings 240 for the passage of liquid from the space 282 about the rotor to the cooling chamber 238. A central opening 242 in the supporting plate 246 communicates with the central bore 284 in the shaft 212 and the liquid may be circulated by suitable means such as the slinger slots or impeller means shown at 186 and 196 in FIG. 5.

The cooling chamber is provided with cooling means such as the cooling ring 250 which surrounds the cooling chamber 238 and is formed to have water, brine, expanding gas or other cooling agents passed therethrough. The lubricating liquid is thus circulated from the space 282 within the motor casing 208 through the openings 240 to the exterior of said casing and through the cooling chamber 238. The liquid is there cooled by heat exchange with the cooling medium supplied to the cooling ring 250 and returns through the opening 242 to the bore 284 in shaft 212 for recirculation through the space 282.

The alternative form of the invention shown in FIG. 7 permits the use of a cooling coil through which water, brine or other cooling agents may be circulated in contact with the liquid circulated about the rotor. For this purpose the sleeve 344 and the motor casing 308 are extended beyond the bearing supporting plate 346 to provide a chamber 350 through which the cooling and lubricating liquid in space 382 may be circulated. A cover plate 338 closes the outer end of chamber 350 and carries a coil 352 connected at one end to an inlet fitting 354 and at the other end to an outlet fitting 356. The cover plate and its coil may thus be applied to and removed from the motor casing as a unit and are held in place by a retaining ring 358 which is secured to the motor casing by bolts 360. The cover plate itself may be secured to the ring 362 which is welded to the sleeve 344 and supported by the spacer ring 364 which holds the bearing supporting plate 346 and shaft end bearing 370 in place.

In using this construction, the lubricating and cooling liquid in the space 382 about the rotor and shaft end bearing 370 may be circulated in any suitable way as by means of slinger slots communicating with the bore 384 in the shaft 312. The liquid passes through the openings 340 in the supporting plate 346 to the space 350 where it is cooled by the coil 352 returning through the opening 342 to the bore 384 of the shaft.

In each of the forms and modifications of the present invention, the design of the elements is simplified and constructions provided which serve to assure efficient cooling and lubrication of the motor and its bearings while protecting the various parts from damage due to undesired liquid or particles which might be injurious to the device.

The various modifications of the invention which have been shown and described are typical of those changes in form, construction and arrangement of the elements which may be made in constructing and adapting the invention to any particular application or use. In view thereof, it should be understood that those embodiments of the invention shown in the drawings and described above are intended to be illustrative only and are not intended to limit the scope of the invention.

I claim:

1. An assembly comprising a motor having a stator, a rotor, a shaft to which the rotor is secured, a tubular sleeve formed of non-magnetic material positioned between the rotor and stator and surrounding the rotor and one end of the shaft, a plate fitted within and secured to one end of said sleeve and cooperating therewith to form a cup defining a liquid-tight space extending about the rotor and said end of the shaft, a bearing for said end of the shaft supported by said plate, and means on said shaft for circulating liquid through said space and into contact with said rotor and bearing, the motor having a casing slidably movable endwise of the liquid-tight cup into and out of position to enclose the stator.

2. The combination defined by claim 1 wherein the motor extends about the stator and rotor and is provided with means communicating with said cup extending to the exterior of the motor casing for cooling liquid circulated within said cup.

3. The combination defined by claim 1 wherein the shaft has a longitudinal bore therein and a passage is formed in said plate extending from said space to said bore for the circulation of liquid from said space through said shaft.

4. The combination defined by claim 3 wherein a screen is located in the bore of said shaft.

5. The combination defined by claim 3 wherein a flame arrester is located in the bore of said shaft.

6. A motor-pump assembly comprising a motor casing enclosing a stator and a rotor, a shaft to which said rotor is secured, a pump housing secured to said motor casing, an impeller located in said pump housing and secured to one end of said shaft, a tubular sleeve formed of non-magnetic material located between said stator and rotor, said sleeve being closed at one end by a supporting plate fitted within and cooperating with the sleeve to form a cup defining a liquid-tight space extending about said rotor and the opposite end of the shaft, and a bearing for said opposite end of said shaft carried by said supporting plate, said motor casing being slidably movable endwise with respect to the cup into and out of position to enclose the stator.

7. A motor-pump assembly comprising a motor casing enclosing a stator and a rotor, a shaft to which said rotor is secured, a pump housing secured to said motor casing, an impeller located in said pump housing and secured to one end of said shaft, a tubular sleeve formed of non-magnetic material located between said stator and rotor, said sleeve being closed at one end by a supporting plate fitted within and cooperating with said sleeve to form a liquid-tight cup enclosing the rotor and the opposite end of said shaft, a bearing for said opposite end of said shaft carried by the supporting plate and positioned within said cup, the opposite end of said sleeve having a liquid-tight seal with the motor casing, and means forming passageways for the circulation of liquid from said pump housing through said sleeve and into contact with said rotor and bearing, said motor casing being slidably movable endwise with respect to the cup into and out of position to enclose the stator.

8. The combination defined in claim 7 wherein said opposite end of the sleeve is provided with a flange which serves to close a space having a gasket therein formed of a plastic material capable of cold flow, and means are provided for pressing said flange against said gasket to deform the gasket and establish a seal between the flange and gasket by cold flow of the plastic material of which the gasket is formed.

9. An assembly comprising a motor having a stator and a rotor, means forming a space in which the rotor is located, a shaft to which the rotor is secured, said shaft having a bore extending longitudinally thereof and communicating with said space near one end thereof and means for circulaing liquid in a closed path through said space and about said rotor and thence through said bore and back to said space including radially extending slots communicating with said bore near the opposite end of said space, and means forming a volute into which liquid is projected from said slots when the shaft is rotated, said volute having an outlet communicating with the space near said opposite end thereof.

10. A motor-pump assembly comprising a motor casing, a rotor and a stator located in said motor casing, an impeller located in said pump housing, a shaft extending from the motor casing into said pump housing, said rotor and impeller being secured to said shaft, means forming passageways for circulating liquid from said pump housing through the motor casing and about said rotor including a bore extending axially of said shaft and passageways inclined outwardly from said bore to points near the central portion of said impeller, and means secured to the end of the shaft adjacent the center of the impeller and projecting outward from the center portion of the impeller to points adjacent the ends of the inclined passageways to direct liquid from the central portion of the impeller outwardly across the ends of said inclined passageways so as to create a venturi effect promoting the flow of liquid outward from said inclined passageways.

References Cited in the file of this patent

UNITED STATES PATENTS

| | | |
|---|---|---|
| 1,834,803 | Plenge | Dec. 1, 1931 |
| 2,741,990 | White | Apr. 17, 1956 |
| 2,769,934 | Stone et al. | Nov. 6, 1956 |
| 2,777,963 | Kuntz | Jan. 15, 1957 |
| 2,805,626 | Pezzillo et al. | Sept. 10, 1957 |
| 2,871,791 | Litzenberg | Feb. 3, 1959 |
| 2,900,919 | Anderson et al. | Aug. 25, 1959 |
| 2,906,208 | White | Sept. 29, 1959 |
| 2,925,041 | Sigmund | Feb. 16, 1960 |
| 2,939,399 | Rutschi | June 7, 1960 |
| 2,968,250 | Lobanoff et al. | Jan. 17, 1961 |
| 2,994,004 | Macha et al. | July 25, 1961 |

FOREIGN PATENTS

| | | |
|---|---|---|
| 1,041,364 | Germany | Oct. 16, 1958 |